June 3, 1969          G. D. JENNEY          3,447,555
HYDRAERIC POSITION MONITORING APPARATUS
Filed May 24, 1965
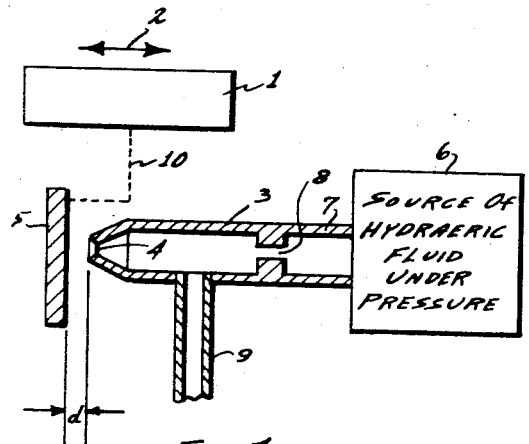
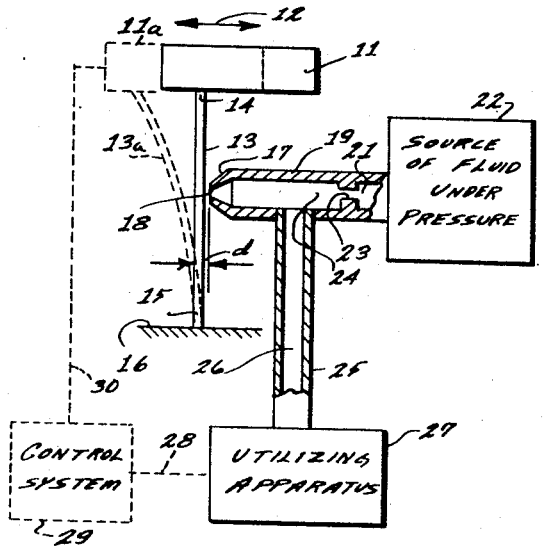
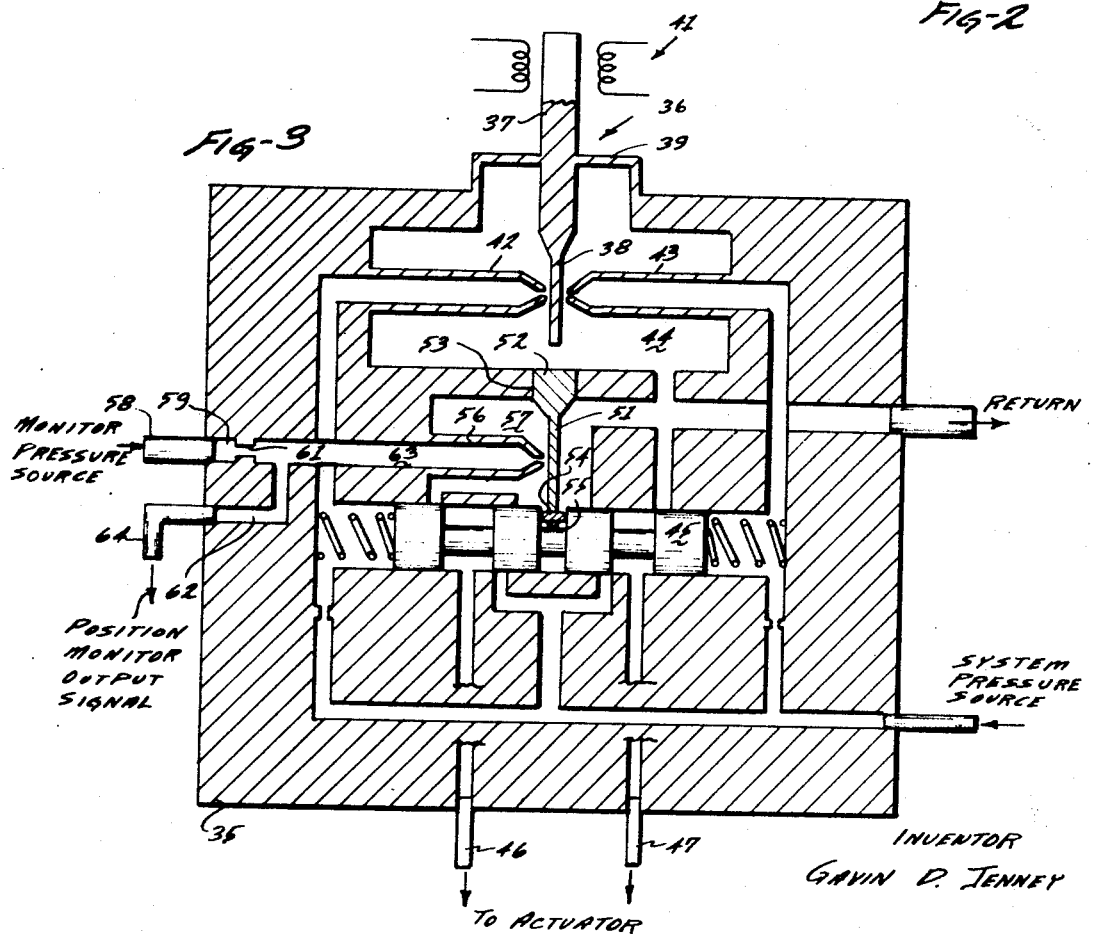
INVENTOR
GAVIN D. JENNEY
ATTORNEYS United States Patent Office 3,447,555
Patented June 3, 1969

3,447,555
HYDRAERIC POSITION MONITORING APPARATUS
Gavin D. Jenney, Sepulveda, Calif., assignor to Bell Aerospace Corporation, a corporation of Delaware
Filed May 24, 1965, Ser. No. 458,224
Int. Cl. F15b 5/00
U.S. Cl. 137—82　　　　　　　　　　　　　　　　5 Claims

ABSTRACT OF THE DISCLOSURE

A device for monitoring the position of a pilot operated hydraeric control valve which includes a nozzle supplied with fluid pressure and a bendable flapper having one end anchored and the other end rigidly connected to move with the control valve. An intermediate portion of the flapper cooperates with the nozzle so that the pressure in the nozzle is indicative of the position of the main control valve.

---

This invention relates to position monitoring apparatus and more particularly to apparatus for producing a hydraeratic signal proportional to the position of a movable member. The term hydraeric and its derivatives as used throughout this specification and claims, is defined as being generic to hydraulic and pneumatic and as synonymous, in the broad sense, with fluid under pressure.

In the prior art it has long been desirable to monitor the position of a given movable member for various reasons. For example, it is desirable to monitor the position of an aircraft control surface, the position of a cutting or grinding surface on a milling machine or the like, or similar such apparatus for determining whether control of the same is being effected in accordance with a desired program. In some cases in the prior art such monitoring has been accomplished mechanically such as by direct reading gauges, feelers, or the like. Such apparatus is extremely difficult to couple to any automatic utilizing apparatus and is sensitive to temperature changes and friction. Particularly to permit coupling of error signals and transmission thereof over relatively long distances, such monitoring has often been accomplished by the utilization of potentiometers or similar electrical and electromechanical devices, to develop an electrical output signal which is proportional to the position of the member to be monitored. Thus by mechanically moving a part of an electro-mechanical device coupled to the movable member, an electrical signal proportional to position is produced. This electrical signal must thereafter be converted from electrical energy to hydraeric energy for the purpose of then being applied to the hydraeric apparatus normally used for control and actuation of the movable member, the position of which is being monitored.

The electrical signal thus developed, is traditionally of relatively low power and requires power amplification prior to being converted. After the power amplification, the electrical signal is then applied to an electrical-hydraeric transducer mechanism for the purpose of converting the electrical energy to hydraeric energy as above indicated. By the utilization of such transducers, the response of the overall system is drastically slowed, which can under some circumstances, be disastrous.

Under some applications the system or apparatus being monitored is traditionally subjected to relatively high ambient temperatures. Under these circumstances all of the electronic apparatus must be maintained relatively cool to assure that it will operate in accordance with the design criteria. As a result of this requirement, it often is necessary to interconnect the electronic equipment and the movable member, the position of which is being monitored, with a cumbersome wire harness which obviously increases the cost of construction and introduces additional maintenance and reliability problems.

Accordingly, it is an object of the present invention to provide a position monitoring apparatus which is essentially insensitive to ambient temperature changes, which is extremely rugged in construction, which can withstand adverse operating conditions, and which is more reliable than presently known prior art apparatus.

It is another object of the present invention to provide a position monitoring apparatus which requires no power amplification of the generated position signal, and which has a faster response than presently known prior art apparatus.

It is another object of the present invention to provide a position monitoring apparatus which eliminates the necessity of mechanically coupling small signals or transmitting them over long distances or of utilizing a wire harness interconnection and electrical signal to hydraeric signal transducing apparatus.

It is a further object of the present invention to provide a position monitoring apparatus which is simpler, less expensive to construct, and requires less maintenance than presently known prior art apparatus.

Position monitoring apparatus in accordance with a broad aspect of the present invention includes nozzle means adapted for connection to a source of hydraeric fluid under pressure and having an orifice through which the fluid is expelled. Positioned a predetermined distance from the nozzle orifice is a baffle member against which the fluid is directed. When the distance is at said predetermined distance, a reference pressure is established at the nozzle. Means is interconnected between a movable member, the position of which is to be monitored, and at least one of the nozzle means or baffle member to cause movement thereof as the movable member changes and thus to vary the distance between the nozzle orifice and the baffle member. As the predetermined distance changes the pressure at said nozzle changes proportionally thereto thus providing a hydraeric signal uniquely indicative at all times of the position of the movable member.

Position monitoring apparatus in accordance with one specific form of the present invention includes a bendable beam member which is in engagement with a movable member, the position of which is being monitored. Nozzle means is cooperatively associated with the bendable beam member to produce a hydraeric signal proportional to the position of the movable member. Hydraeric signal detecting means is connected to the signal producing means for detecting and conveying the hydraeric signal to utilizing apparatus.

Additional objects and advantages of the present invention both as to its organization and method of operation will become apparent from a consideration of the following description taken in conjunction with the accompanying drawing which is presented by way of example only, and is not intended as a limitation upon the scope of the claims appended hereto, and in which:

FIG. 1 is a schematic representation of position monitoring apparatus in accordance with the present invention;

FIG. 2 is a schematic representation of one form which position monitoring apparatus in accordance with the present invention may take; and FIG. 3 is a cross-sectional view, in schematic illustration, of one form of hydraeric device embodying a position monitoring apparatus in accordance with the present invention.

In accordance with a more specific aspect of the present invention, a bendable beam is rigidly anchored at one end thereof. The opposite end of the thus anchored bendable beam is connected to or is in engagement with, a movable member, the position of which it is desired to monitor and moves in a following relationship with said member. A nozzle which is connected to a passageway which is in turn connected to a source of hydraeric pressure and which includes a restriction orifice therein is positioned adjacent the bendable beam member. The hydraeric fluid is directed by means of the nozzle against the bendable beam. As the member whose position is being monitored changes position, the distance between the nozzle and the bendable beam changes accordingly. The change in this distance in turn causes a change in the pressure of the hydraeric fluid in the chamber defined between the restriction orifice and the nozzle. Passageway means is connected between the restriction orifice and the nozzle for detecting this change in pressure which is in turn coupled to a desired utilizing apparatus.

Referring now to the drawing and more particularly to FIG. 1 thereof there is illustrated in schematic form the broad concept of the present invention. A member 1 which is movable as indicated by the arrow 2 may be any object, or part thereof, the position of which it is required to know at all times. For example the member 1 may be a spool valve in a hydraulic servo system or an actuator which forms part of a hydraulic servo system; it may be the control surface of an aircraft, or the head or workpiece of a machine tool. In short, the member 1 may be any object the position of which is to be monitored.

The monitoring of the position of the member 1 is accomplished by providing a nozzle 3 having an orifice 4 through which hydraeric fluid under pressure is expelled. A baffle member such as plate 5 is positioned adjacent the nozzle orifice 4. The expelled fluid is then directed against the plate 5. The plate 5 is spaced from the nozzle orifice 4 by a predetermined distance $d$. The distance $d$ is selected such that when member 1 is in its null position a reference pressure is established in that area between the end of the nozzle and the plate 5, referred to herein as at the nozzle 3.

A source 6 of hydraeric fluid under pressure is connected by way of conduit 7 having a restriction orifice therein to the nozzle 3. Conduit means 9 is connected to the nozzle 3 for purposes of coupling pressure changes from the nozzle to any desired apparatus capable of using such information.

Coupling means shown by the dashed line 10 connects the member 1 to the plate 5. As a result of such coupling, movement of member 1 for any reason causes movement of the plate 5. Such movement of the plate 5 varies the spacing $d$ between the nozzle orifice 4 and the plate 5. As the spacing $d$ is varied, the pressure at the nozzle 3 changes accordingly. That is, if the spacing $d$ is decreased, the pressure at nozzle 3 increases while if the spacing increases, the pressure decreases. These pressure changes are present also in the chamber between the nozzle orifice 4 and the restriction orifice 8 and are in turn coupled by conduit 9 to apparatus capable of using the same for any desired purpose. Thus there is provided a hydraeric signal which is at all times directly indicative of the position of the member 1.

Referring now more particularly to FIG. 2, position monitoring apparatus in accordance with one form of the present invention is there schematically illustrated. As is shown, the member whose position is to be monitored is indicated by the block 11. As is also shown by the double ended arrow 12, the member 11 is movable in either direction by forces applied thereto from a source thereof (not shown). Such is also indicated by the alternate dashed position 11a, of the member 11. A baffle member in the form of a bendable beam 13 is affixed at one terminal end 14 thereof to the movable member 11, and travels therewith in response to movement of the member 11. This movement or bending of the beam 13 is indicated and illustrated by the dashed alternate position 13a of the bendable beam 13. The other terminal end 15 of the bendable beam member 13 is rigidly anchored as is indicated by the ground symbol 16, such as by being rigidly attached to a housing or the like. It should be expressly understood that it is not required that the bendable beam be rigidly anchored at its opposite terminal end although such is presently preferred. A nozzle 17 having an orifice 18 is positioned in such a manner that when the bendable beam 13 is in its quiescent or non-bent state, there is a predetermined distance $d$ between the surface of the beam and the orifice 18. The nozzle 17 is connected by a conduit 19 defining a passageway 21 to a source of fluid under pressure 22. The passageway 21 defines a restriction orifice 23 therein, which functions in the normally accepted manner.

The hydraeric fluid from the source 22 thereof is expelled from the orifice 18 and is directed against the surface of the beam 13. When the beam is spaced the predetermined distance $d$ away from the orifice 18, a predetermined amount of pressure is experienced within the chamber 24 defined by the conduit 19 between the restriction orifice 23 and the nozzle orifice 18. Such predetermined reference pressure is indicative that the member 11 is in its quiescent or null position. As the bendable beam moves into the position illustrated at 13a, in such a manner that the distance $d$ increases, the pressure experienced within the chamber 24 decreases, and alternatively as the bendable beam 13 moves in the opposite direction the pressure within the chamber 24 increases and in each case is indicative that member 11 has moved from its quiescent position to the left or right, as viewed in FIG. 2, as the case may be. The amount of pressure present within the chamber 24 at any moment is proportional to the distance $d$ between the surface of the beam 13 and the orifice 18 of the nozzle 17, or as can also be stated, the pressure present within the chamber 24 is proportional at any moment to the position of the movable member 11 whose position is to be monitored.

A conduit 25 defining a passageway 26 therein is connected to the chamber 24 to detect the pressure variations therein, and to apply the same to a utilizing apparatus 27. The utilizing apparatus 27 may be any apparatus which is desired for the particular application to which the position monitoring apparatus is being put. For example, the utilizing apparatus may be a decision making system which determined whether or not an overall control network is functioning properly see U.S. Patent No. 2,995,014. The output of the utilizing apparatus may in turn be utilized to control movement of the member 12 or to restore manual control of the movement thereof, or a similar such function as may be desired in accordance with any particular application. Such variant utilization of the output signal from the utilizing apparatus 27 is indicated by the dashed line 28 interconnecting the control system 29 also shown in the dashed line, and the additional dashed line 30 interconnecting the control system 29 to the movable member 11.

Referring now more particularly to FIG. 3, there is illustrated in schematic cross-section, one form of a hydraeric device in which an apparatus in accordance with the present invention may be incorporated. As is illustrated, the position of a spool valve in a hydraulic servo system is being monitored.

As is illustarted in FIG. 3, the servo-control valve position monitoring apparatus is contained within a housing 35. As is illustrated a flapper assembly 36 including an armature 37 and a flapper valve 38 is mounted upon its pivot point by the separating member 39 in such a manner that as a control signal is applied to the torque motor windings 41, the flapper valve assembly 36 pivots about its pivot point. Such movement causes the flapper valve 38 to change its position with respect to the nozzles 42 and 43 positioned within the chamber 44. As is well known, and as is thoroughly described in Patent 2,947,286, as the flapper 38 changes its position with respect to the nozzles 42 and 43, a pressure differential is established on opposite sides of the piston or spool valve 45 thus causing it to move in its cylinder and cause fluid to flow from the system pressure source through one or the other of the conduits 46 and 47 leading to the actuator (not shown), thus causing the actuator to to move in accordance with the desired control signal applied to the torque motor winding 41. As is also described in the patent above-referred to, the flapper 38 may be connected to the spool valve 45 to provide a negative feedback signal causing the spool valve 45 to return to its center or quiescent position. For a more detailed description of the construction and operation of this portion of the servo valve, reference may be had to the patent above referred to.

Also incorporated into the housing 35 is a baffle member in the form of a bendable beam member 51 having one terminal end 52 thereof solidly anchored to the housing 35 as is illustrated at 53. The connection 53 between the beam end 52 of the beam 51 and the housing 35 may take the form of a flexible or resilient member having a known spring constant should such be desired. Such construction may be desirable in those applications where a rigid connection would place too large a load on the movable member. In the particular application illustrated the additional load added by the beam is insignificant since extremely high pressures are present to move the spool valve. The opposite terminal end of the bendable beam 51 is attached to the spool valve 45 by way of a sliding engagement between the ball 54 and the groove 55 provided in the valve 45. A nozzle 56 extends into the cavity 57 formed within the housing 35, within which the bendable beam member 51 is disposed, and is positioned adjacent thereto. A monitor pressure source is connected by way of conduit 58 and passageway 59 within the housing 35, and through the restriction orifice 61 to the nozzle 56. An additional pasageway 62 is connected to the chamber 63 formed between the restriction orifice 61 and the orifice of the nozzle 56 and is connected by way of the conduit 64 to any desired utilizing apparatus. In this manner the position monitor output signal is coupled for utilization in accordance with the desired application.

In operation of the device as illustrated in FIG. 3, the hydraeric fluid is applied to the conduit 58, passes through the restriction orifice 61 and out the nozzle 56, into contact with the surface of the bendable member 51. As signals imparted to the torque motor winding 41 cause a differential in pressure across the ends of the spool valve 45 causing it to move to the right or left as viewed in FIG. 3, the attachment by way of the ball 54 of the bendable member 51 to the spool valve 45 causes the space between the bendable member 51 and the orifice of the nozzle 56 to vary. The variation in this space causes the hydraeric pressure signal within the chamber 63 to vary accordingly, that is, a hydraeric pressure signal is developed within the chamber 63, which is proportional to the position of the spool valve 45 at any given moment. This hydraeric signal is the position monitor output signal which is coupled by way of the conduit 64 to any desired utilizing apparatus.

It should be expressly understood as was above pointed out, that in any desired apparatus the flapper assembly 36 could be disposed at any desired angle to the bendable beam 51.

There has thus been disclosed an apparatus for monitoring the position of a movable member which relies solely upon hydraeric signals and thus minimizes temperature sensitivity and the necessity of converting electrical to hydraeric signals as heretofore required by prior art apparatus. Since such apparatus is solely hydraeric, it is more compatible with the hydraeric control apparatus already in utilization for various control purposes, and is therefore more stable, reliable, less inexpensive, and requires little or no maintenance. Although the position monitoring apparatus in accordance with the present invention has been illustrated in several embodiments, it is to be expressly understood that such is by way of illustration and description only, and is not intended to be a limitation upon the claims appended hereto.

What is claimed is:

1. Hydraeric apparatus comprising main valve means for controlling flow from a source to passage means and including a movable element, pilot valve means responsive to an input signal for controlling the position of said movable element as a function of the input signal, the improvement of monitor apparatus for said movable element comprising:

(a) a bendable beam member having one end thereof anchored and the other end thereof in direct engagement with said movable element;

(b) nozzle means defining a chamber and positioned adjacent and spaced from said beam member a predetermined distance when said element is in its quiescent position and adapted to direct hydraeric fluid under pressure against said beam member to provide a hydraeric pressure reference signal;

(c) said predetermined distance being changed only in response to movement of said movable element which bends said beam member thereby varying the pressure signal in said chamber only in response to movement of said movable element; and (d) passageway means connected to said chamber for communicating said pressure signal changes.

2. Apparatus for monitoring the position of a movable element as defined in claim 1 wherein said chamber is defined by a restriction orifice and the orifice of said nozzle means, said passageway means being connected between said restriction orifice and said nozzle orifice.

3. Apparatus for monitoring the position of a movable element in accordance with claim 2 wherein said movable element is a valve spool slidably mounted for controlling fluid flow from said source thereof to an actuator.

4. Apparatus for monitoring the position of a movable element in accordance with claim 3 which includes a housing which defines a cavity wherein said nozzle orifice and said beam adjacent thereto are positioned and further includes a passageway connected between return and said cavity.

5. Apparatus for monitoring the position of a movable element as defined in claim 4 wherein said valve spool defines a groove therein and said other end of said beam member is disposed within said groove and said one end thereof is rigidly anchored to said housing.

References Cited

UNITED STATES PATENTS

| 2,926,696 | 3/1960 | Kolm | 137—625.62 |
| 3,002,374 | 10/1961 | Jacobs | 73—37.5 |
| 3,233,623 | 2/1966 | Gray | 137—625.12 X |

FOREIGN PATENTS

| 830,705 | 2/1952 | Germany. |

ALAN COHAN, *Primary Examiner.*

U.S. Cl. X.R.

137—553, 557, 625.64, 625.63, 625.62